United States Patent
Kosakowski et al.

(10) Patent No.: US 6,668,955 B1
(45) Date of Patent: Dec. 30, 2003

(54) METHODS AND APPARATUS FOR MOUNTING A HEAT EXCHANGER TO A VEHICLE

(75) Inventors: James W. Kosakowski, St. Clair Shores, MI (US); John L. Brummans, Warren, MI (US); Timothy R. Hoye, Wyandotte, MI (US); Tehui Peng, Rochester Hills, MI (US); Edward J. Strzelecki, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/455,341

(22) Filed: Dec. 6, 1999

(51) Int. Cl.[7] .......................... B60K 11/04; B62D 25/10
(52) U.S. Cl. ................................ 180/68.4; 180/69.23
(58) Field of Search .......................... 180/68.4, 68.6, 180/69.2, 69.21, 69.22, 69.23; 296/207, 76; 248/213.3, 213.4, 635; 292/DIG. 14; 165/67, 153

(56) References Cited

U.S. PATENT DOCUMENTS

| | | | | |
|---|---|---|---|---|
| 2,756,085 A | * | 7/1956 | Hochstadt | 180/69.2 |
| 3,121,467 A | * | 2/1964 | Bryant | 180/68.4 |
| 3,534,570 A | * | 10/1970 | Mauro | 180/69.2 |
| 3,922,429 A | * | 11/1975 | Welch et al. | 428/315 |
| 4,417,635 A | | 11/1983 | Thepault | 180/68 R |
| 4,564,168 A | | 1/1986 | Ikuta et al. | 248/638 |
| 4,579,184 A | | 4/1986 | Hiramoto | 180/68.4 |
| 4,766,968 A | | 8/1988 | Matsunaga | 180/68.4 |
| 4,858,866 A | * | 8/1989 | Werner | 248/213.3 |
| 5,219,017 A | * | 6/1993 | Halstead et al. | 165/41 |
| 5,287,792 A | * | 2/1994 | Betros et al. | 91/375 R |
| 5,487,422 A | * | 1/1996 | Bertva et al. | 165/67 |
| 5,558,310 A | | 9/1996 | Furuie et al. | 248/573 |
| 5,605,200 A | * | 2/1997 | Mayberry et al. | 180/68.4 |
| 6,340,066 B1 | * | 1/2002 | Dettling et al. | 180/54.1 |
| 2002/0112906 A1 | * | 8/2002 | Guyomard et al. | 180/68.4 |

* cited by examiner

*Primary Examiner*—Brian L. Johnson
*Assistant Examiner*—G B Klebe
(74) *Attorney, Agent, or Firm*—Laura C. Hargitt

(57) ABSTRACT

A mounting system for a heat exchanger includes an isolator fabricated of a nitrile rubber material to dampen vibrations. The isolator includes a body portion and a pair of legs. The body portion includes a pair of openings sized to receive a vehicle hood latch support. The legs include contoured inner surfaces and are sized to straddle the top surface of the heat exchanger. A vehicle hood latch support assembly is frictionally attached within the isolator body portion openings. As the vehicle is initially assembled, the isolator legs straddle the heat exchanger to secure the heat exchanger to the vehicle.

3 Claims, 3 Drawing Sheets

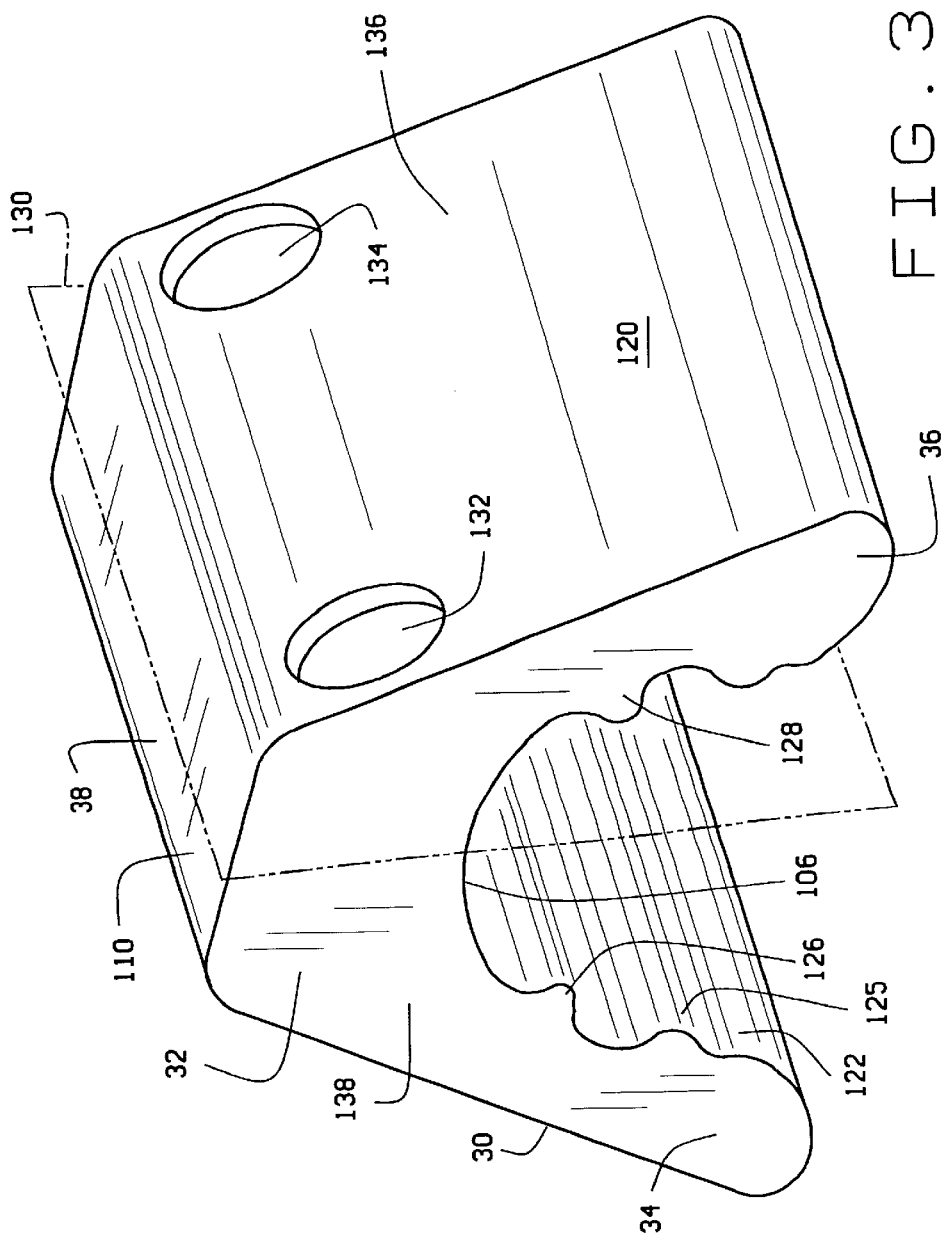

METHODS AND APPARATUS FOR MOUNTING A HEAT EXCHANGER TO A VEHICLE

BACKGROUND OF THE INVENTION

This invention relates generally to mounting systems and, more particularly, to mounting systems for mounting a heat exchanger to a vehicle.

Known mounting systems which secure a heat exchanger to a vehicle include a pair of upper and lower support brackets. Each of the upper support brackets includes a metal arm portion aligned and attached to a radiator support member. Each upper support bracket also includes a metal support plate bent including a hole which receives a mounting pin extending from the heat exchanger. A thin rubber member is attached below the metal support plate and is attached to a hold plate which anchors the heat exchanger along its top portion.

The rubber member is vulcanized and may easily be torn by sharp edges. As a result, any metal members that contact the rubber member are de-burred to prevent damage to the rubber member. Additionally, all of the metal components of the mounting system that are de-burred are sprayed with a rust-inhibiting agent. The heat exchanger is then positioned within the vehicle frame and carefully aligned so that fastener openings in the bracket assemblies align with pre-drilled holes in the vehicle frame. Lastly, a plurality of fasteners is attached to secure the heat exchanger to the vehicle frame.

Known heat exchanger mounting systems are complicated and require many assembly steps. As a result, securing the heat exchanger to the vehicle is a labor-intensive and time-consuming process.

BRIEF SUMMARY OF THE INVENTION

In an exemplary embodiment, a mounting system for a heat exchanger is easily installed, reliable, and is resilient to vibrations. The mounting system includes an isolator fabricated of a nitrile rubber material which dampens vibrations. The isolator includes a body portion and a pair of legs. The body portion includes a pair of openings sized to receive a vehicle hood latch support. The legs include contoured inner surfaces and are sized to straddle the top surface of the heat exchanger.

During the initial assembly of the vehicle, the hood latch support assembly is frictionally attached within the isolator body portion openings. As the vehicle is initially assembled, the vehicle body is assembled to the vehicle frame and the isolator legs straddle the heat exchanger and guide the heat exchanger into proper position prior to securing the heat exchanger to the vehicle.

The mounting system eliminates a need for more costly, labor-intensive, and complicated heat exchanger mounting systems. In addition, although the system is compact in size, the system has a high damping efficiency.

BRIEF DESCRIPTION OF THE DRAWINGS

FIG. 3 is a perspective view of an isolator used in the heat exchanger mounting system shown in FIG. 1.

DETAILED DESCRIPTION OF THE INVENTION

Figure 1:
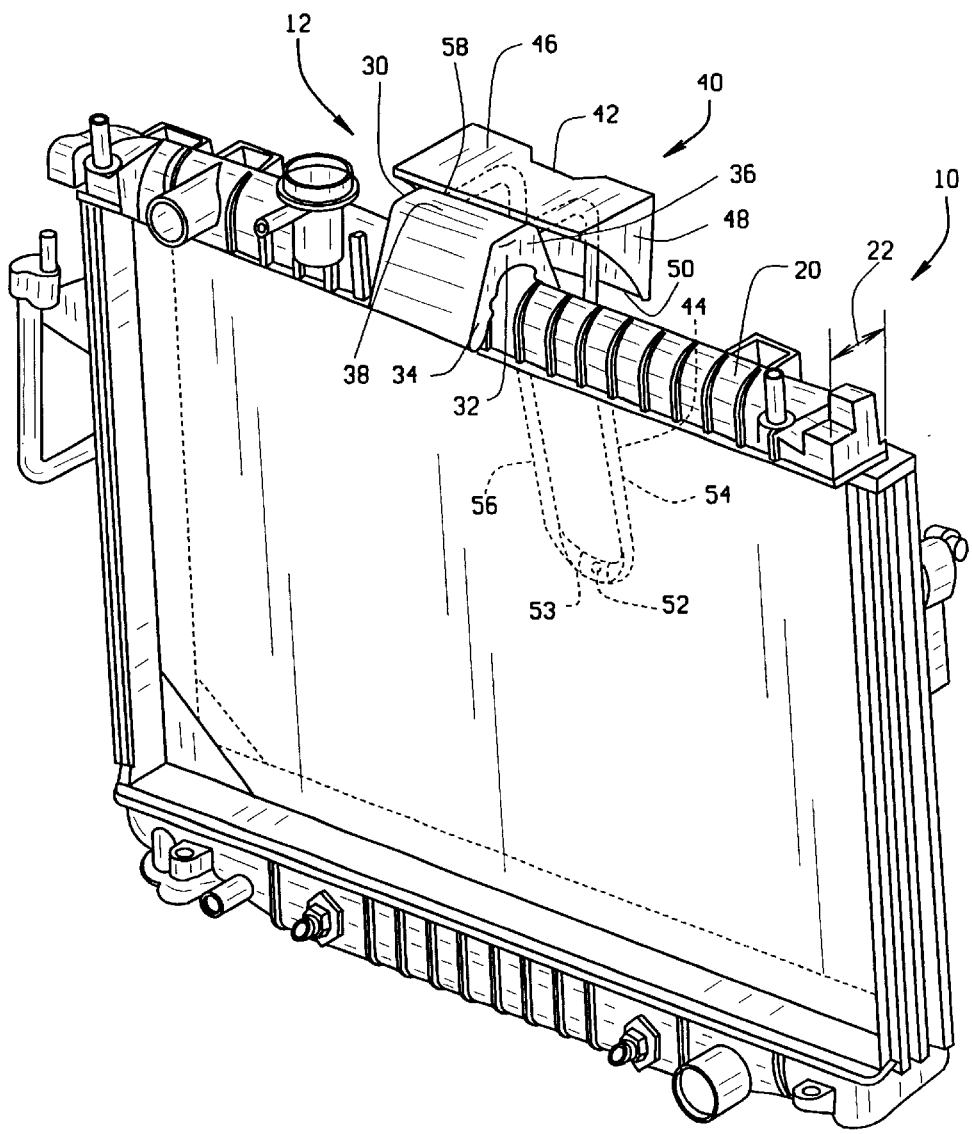
FIG. 1 is a perspective view of a heat exchanger including a heat exchanger mounting system.

FIG. 1 is a perspective view of a heat exchanger 10 including a heat exchanger mounting system 12. Heat exchanger 10 includes a top surface 20 which has a width 22. Heat exchanger mounting system 12 includes an isolator 30 which includes a body portion 32. Isolator 30 is fabricated from a material which dampens any vibrations induced by road load inputs. In one embodiment, isolator 30 is fabricated from nitrile rubber material.

A first leg 34 and a second leg 36 extend from isolator body portion 32 and are sized to straddle heat exchanger top surface 20. When installed, isolator 30 is substantially centered on heat exchanger top surface 20 and is positioned such that first leg 34 extends from body portion 32 adjacent heat exchanger rear surface 14 and second leg 36 extends from body portion 32 adjacent the heat exchanger front surface. Body portion 32 includes a plurality of openings (not shown in FIG. 1) and a top surface 38. The openings are sized to receive a hood latch assembly 40.

Hood latch assembly 40 includes a support portion 42 and an extension portion 44. Support portion 42 includes a top member 46, a first side 48, a second side (not shown), and a front side 50. Top member 46 is substantially flat and extends substantially perpendicularly from front side 50 towards heat exchanger 10. First side 48 also extends substantially perpendicularly from front side 50 towards heat exchanger 10 and is connected to top member 46. The second side is constructed identically to first side 48 and also extends substantially perpendicularly from front side 50 towards heat exchanger 10 and connects to top member 46.

Hood latch assembly extension portion 44 includes an opening 52 positioned at a first end 53 of extension portion 44. Opening 52 is sized to receive a fastener (not shown) therethrough which secures extension portion 44 to the vehicle. Extension portion 44 also includes a first leg 54 and a second leg 56. First leg 54 is substantially parallel to second leg 56 from first end 53 of extension portion 44 to a second end 58 of extension portion 44 and both legs 54 and 56 have circular cross-sectional profiles.

Figure 2:
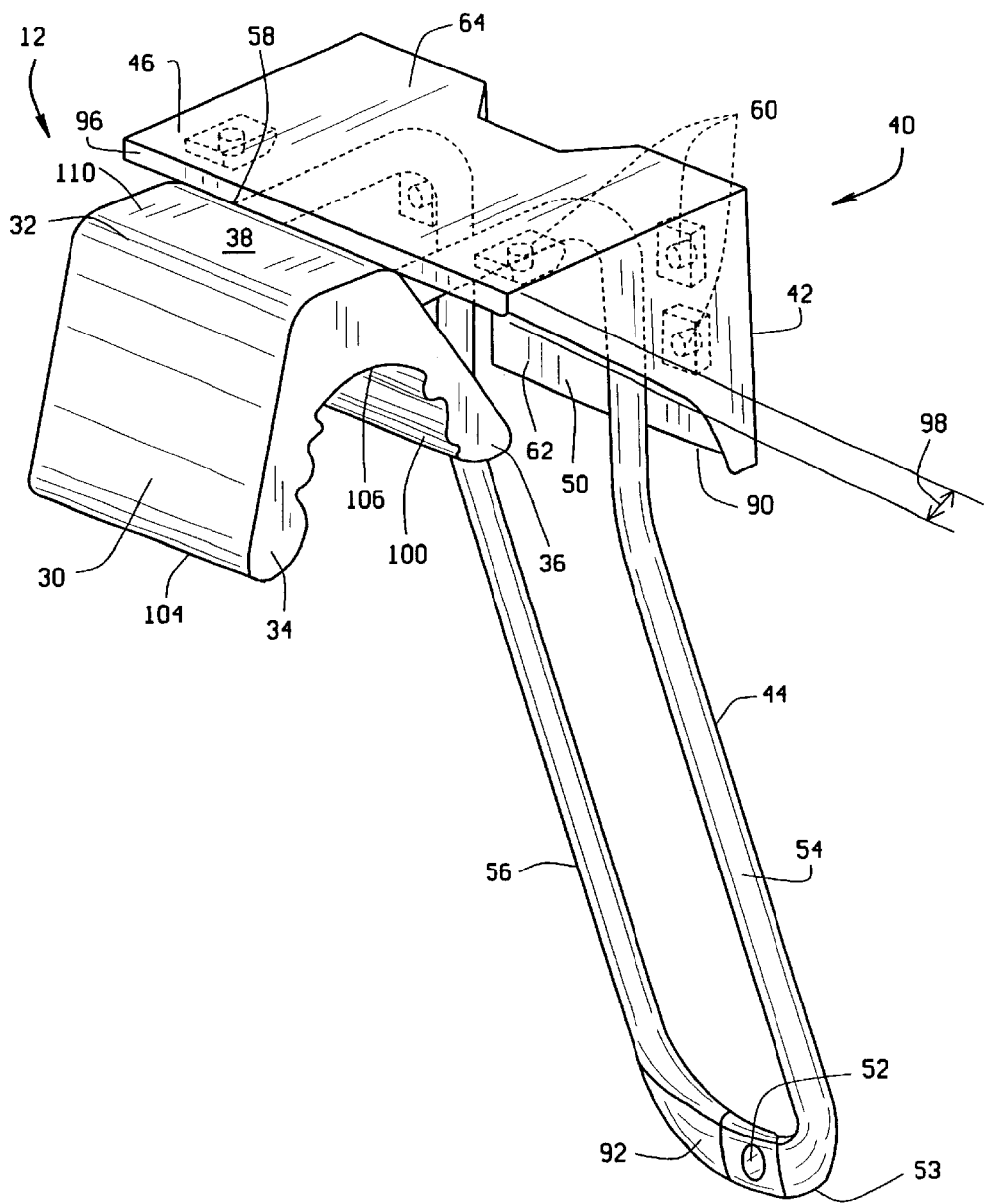
FIG. 2 is a perspective view of the heat exchanger mounting system shown in FIG. 1 including a hood latch support.

FIG. 2 is a perspective view of heat exchanger mounting system 12 installed to hood latch assembly 40. Hood latch assembly support portion 42 includes a plurality of openings 60 which extend from an inner surface 62 of front wall 50 to an outer surface (not shown) of front wall 50. Additional openings 60 extend from an inner surface (not shown) of top member 46 to an outer surface 64 of top member 46. Openings 60 are sized to receive fasteners (not shown) therethrough which anchor hood latch assembly 40 to the vehicle.

Hood latch assembly extension portion 44 is attached to support portion 42. First leg 54 is constructed identically to second leg 56. Hood latch assembly front side 50 has an edge 90. Legs 54 and 56 extend outward from edge 90 towards extension portion first end 53 and are substantially parallel with front wall 50. An end loop 92 is located at second end 58 of extension portion 44 and connects legs 54 and 56. End loop 92 receives legs 54 and 56 and is substantially flat between legs 54 and 56 adjacent opening 52.

Legs 54 and 56 are attached to front wall inner surface 62 and extend adjacent to and substantially parallel to front wall 50 towards extension portion second end 58. Adjacent the top member inner surface, legs 54 and 56 are curved to extend substantially perpendicularly from front wall 50 towards isolator 30. Legs 54 and 56 extend outward from a top member edge 96 towards isolator 30 in a direction substantially parallel with top member 46.

Isolator 30 includes a plurality of openings (not shown in FIG. 2) extending into isolator body portion 32. The isolator openings are sized to receive legs 54 and 56. Legs 54 and 56 frictionally fit within the isolator openings. First leg 54 and second leg 56 extend a distance 98 from top member 46 which permits isolator 30 to straddle heat exchanger 30 when heat exchanger mounting system 12 is fully installed.

Isolator second leg 36 includes a contoured inner surface 100 and a substantially smooth outer surface (not shown in FIG. 2) and isolator first leg 34 includes a contoured inner surface (not shown in FIG. 2) and a substantially smooth outer surface 104. Isolator body portion 32 includes an arched inner surface 106 which extends between first leg inner surface 100 and the second leg inner surface. Body portion 32 also includes a substantially smooth outer surface 110 which extends from second leg outer surface 104 to the first leg outer surface.

FIG. 3 is a perspective view of isolator 30 including body portion 32, first leg 34 and second leg 36. Second leg 36 includes contoured inner surface 100 (shown in FIG. 2) and a substantially smooth outer surface 120. First leg 34 is identical to second leg 36 and includes a smooth outer surface 104 (shown in FIG. 2) and a contoured inner surface 122. Body portion 32 includes smooth outer surface 110 and arched inner surface 106. Contoured inner surfaces 100 and 122 include a plurality of projections 125 which extend inward. Arched inner surface 106 is sized to receive heat exchanger top surface 20 (shown in FIG. 2) and extends between a first projection 126 of first leg contoured inner surface 122 and a first projection 128 of second leg contoured inner surface 100 (shown in FIG. 2).

Isolator 30 has a center axial plane 130 and includes a first opening 132 and a second opening 134. Axial plane 130 passes through body portion 32 and evenly divides isolator 30 into body halves 136 and 138. Openings 132 and 134 are disposed in body portion body halve 136 and extend inward from body portion outer surface 110 towards axial plane 130. Openings 132 and 134 are positioned between isolator top surface 38 and isolator arched inner surface 106 and are sized such that hood latch assembly legs 54 and 56 are frictionally fit within openings 132 and 134 with an interference fit.

Isolator 30 is fabricated from a flexible material. The flexible material permits isolator legs 34 and 36 to easily flex during assembly. Accordingly, first projections 126 and 128 can expand to engage heat exchanger top surface 20.

During an initial assembly of a vehicle, a body drop step is completed. During the body drop step, a vehicle body is attached to a vehicle chassis. Before the body drop assembly process, isolator 30 is frictionally fit to hood latch assembly legs 54 and 56. Hood latch assembly 40 is subsequently installed on the vehicle body. During the body drop assembly process, isolator 30 contacts heat exchanger 10 forcing isolator legs 34 and 36 apart. As isolator legs 34 and 36 are flexed outward from axial plane 130, leg contoured inner surfaces 100 and 122 are simultaneously forced outward from axial plane 130 and engage heat exchanger 10. As the body drop assembly process progresses, inner surfaces 100 and 122 position heat exchanger 10 such that heat exchanger top surface 20 is captured adjacent isolator arched inner surface 106 between first projections 126 and 128.

The above described mounting system for positioning and mounting a heat exchanger to a vehicle is reliable, easily installed, and cost-effective. The mounting system includes no fasteners or metal members which reduces the amount of labor to install the heat exchanger. As such a cost-effective and reliable heat exchanger mounting system is provided.

While the invention has been described in terms of various specific embodiments, those skilled in the art will recognize that the invention can be practiced with modification within the spirit and scope of the claims.

What is claimed is:

1. A heat exchanger and a mounting assembly comprising:
    a heat exchanger;
    a vehicle hood latch support; and
    a vibration damping isolator contacting said heat exchanger and said vehicle hood latch support;
    wherein said isolator comprises a first leg, a second leg, and a body extending between said first leg and said second leg, said isolator straddling said heat exchanger and said isolator body comprises an arched inner surface and a plurality of openings for receiving said hood latch support; and
    wherein each of said isolator legs comprises a contoured inner surface comprising a plurality of projections, said isolator leg inner surfaces extend from said body arched inner surface.

2. An assembly in accordance with claim 1 wherein said plurality of openings comprises a first opening and a second opening disposed within said isolator body.

3. An assembly in accordance with claim 2 wherein said isolator comprises nitrile rubber.

* * * * *